United States Patent
Mukherjee et al.

(10) Patent No.: US 10,142,628 B1
(45) Date of Patent: *Nov. 27, 2018

(54) HYBRID TRANSFORM IN VIDEO CODECS

(71) Applicant: GOOGLE INC., Mountain View, CA (US)

(72) Inventors: Debargha Mukherjee, Cupertino, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/373,590

(22) Filed: Dec. 9, 2016

Related U.S. Application Data

(63) Continuation of application No. 13/763,921, filed on Feb. 11, 2013, now Pat. No. 9,544,597.

(51) Int. Cl.
*H04N 19/61* (2014.01)
*H04N 19/11* (2014.01)
(Continued)

(52) U.S. Cl.
CPC .......... *H04N 19/11* (2014.11); *H04N 19/122* (2014.11); *H04N 19/129* (2014.11); *H04N 19/159* (2014.11); *H04N 19/61* (2014.11); *H04N 19/625* (2014.11); *H04N 19/172* (2014.11); *H04N 19/176* (2014.11)

(58) Field of Classification Search
CPC .............................. H04N 19/176; H04N 19/61
See application file for complete search history.

(56) References Cited

U.S. PATENT DOCUMENTS

| 4,774,574 A | 9/1988 | Daly et al. |
| 5,068,724 A | 11/1991 | Krause et al. |

(Continued)

FOREIGN PATENT DOCUMENTS

| JP | 2010199959 A | 9/2010 |
| WO | 99018735 A1 | 4/1999 |

(Continued)

OTHER PUBLICATIONS

Bankoski et al. "Technical Overview of VP8, an Open Source Video Codec for the Web". Dated Jul. 11, 2011.

(Continued)

*Primary Examiner* — Zhubing Ren
(74) *Attorney, Agent, or Firm* — Young Basile Hanlon & MacFarlane, P.C.

(57) ABSTRACT

Decoding an encoded video stream may include identifying an encoded block identifying an intra prediction mode for decoding the encoded block from the encoded video stream, identifying a transform mode from a plurality of transform modes for decoding the encoded block based on the intra prediction mode, identifying a probability model from a plurality of probability models for decoding the encoded block based on the transform mode, identifying a scan mode for decoding the encoded block based on the transform mode, generating a decoded block by decoding the encoded block using the scan mode, the probability model, the transform mode, and the intra prediction mode, and outputting or storing the decoded block.

20 Claims, 11 Drawing Sheets

(51) Int. Cl.
*H04N 19/159* (2014.01)
*H04N 19/129* (2014.01)
*H04N 19/122* (2014.01)
*H04N 19/625* (2014.01)
*H04N 19/176* (2014.01)
*H04N 19/172* (2014.01)

(56) References Cited

U.S. PATENT DOCUMENTS

| | | |
|---|---|---|
| 5,091,782 A | 2/1992 | Krause et al. |
| 5,121,216 A | 6/1992 | Chen et al. |
| 5,146,324 A | 9/1992 | Miller et al. |
| 5,224,062 A | 6/1993 | McMillan, Jr. et al. |
| 5,235,623 A | 8/1993 | Sugiyama et al. |
| 5,260,782 A | 11/1993 | Hui |
| 5,274,442 A | 12/1993 | Murakami et al. |
| 5,341,440 A | 8/1994 | Earl et al. |
| 5,422,963 A | 6/1995 | Chen et al. |
| 5,444,800 A | 8/1995 | Kim |
| 5,635,938 A | 6/1997 | Komoto |
| 5,737,020 A | 4/1998 | Hall et al. |
| 5,764,805 A | 6/1998 | Martucci et al. |
| 5,767,908 A | 6/1998 | Choi |
| 5,872,866 A | 2/1999 | Strongin et al. |
| 5,903,669 A | 5/1999 | Hirabayashi |
| 6,108,383 A | 8/2000 | Miller et al. |
| 6,115,501 A | 9/2000 | Chun et al. |
| 6,134,350 A | 10/2000 | Beck |
| 6,167,161 A | 12/2000 | Oami |
| 6,408,025 B1 | 6/2002 | Kaup |
| 6,522,783 B1 | 2/2003 | Zeng et al. |
| 6,522,784 B1 | 2/2003 | Zlotnick |
| 6,683,991 B1 | 1/2004 | Andrew et al. |
| 6,819,793 B1 | 11/2004 | Reshetov et al. |
| 6,917,651 B1 | 7/2005 | Yoo et al. |
| 6,934,419 B2 | 8/2005 | Zlotnick |
| 7,266,149 B2 | 9/2007 | Holcomb et al. |
| 7,292,634 B2 | 11/2007 | Yamamoto et al. |
| 7,409,099 B1 | 8/2008 | Ameres et al. |
| 7,492,823 B2 | 2/2009 | Lee et al. |
| 7,894,530 B2 | 2/2011 | Gordon et al. |
| 7,912,318 B2 | 3/2011 | Nakayama |
| 7,936,820 B2 | 5/2011 | Watanabe et al. |
| 8,000,546 B2 | 8/2011 | Yang et al. |
| 8,094,950 B2 | 1/2012 | Sasagawa |
| 8,116,374 B2 | 2/2012 | Gordon et al. |
| 8,494,290 B2 | 7/2013 | Cohen et al. |
| 8,582,656 B2 | 11/2013 | Lin et al. |
| 8,687,699 B1 | 4/2014 | Wen |
| 8,885,701 B2 | 11/2014 | Saxena et al. |
| 9,106,933 B1 | 8/2015 | Bankoski et al. |
| 9,219,915 B1 | 12/2015 | Bultje et al. |
| 2002/0168114 A1 | 11/2002 | Valente |
| 2002/0196983 A1 | 12/2002 | Kobayashi |
| 2003/0048943 A1 | 3/2003 | Ishikawa |
| 2003/0146925 A1 | 8/2003 | Zhao |
| 2004/0057519 A1 | 3/2004 | Yamamoto et al. |
| 2004/0125204 A1 | 7/2004 | Yamada et al. |
| 2004/0184537 A1 | 9/2004 | Geiger et al. |
| 2005/0025246 A1* | 2/2005 | Holcomb ............ H04N 19/176 375/240.23 |
| 2005/0053151 A1 | 3/2005 | Lin et al. |
| 2005/0147163 A1 | 7/2005 | Li et al. |
| 2005/0249291 A1 | 11/2005 | Gordon et al. |
| 2006/0045368 A1 | 3/2006 | Mehrotra |
| 2006/0098738 A1 | 5/2006 | Cosman et al. |
| 2006/0115168 A1 | 6/2006 | Kobayashi |
| 2006/0133682 A1 | 6/2006 | Tu et al. |
| 2006/0210181 A1 | 9/2006 | Wu et al. |
| 2006/0239575 A1 | 10/2006 | Abe et al. |
| 2006/0251330 A1 | 11/2006 | Toth et al. |
| 2007/0036223 A1 | 2/2007 | Srinivasan |
| 2007/0078661 A1 | 4/2007 | Sriram |
| 2007/0140349 A1 | 6/2007 | Burazerovic |
| 2007/0183500 A1 | 8/2007 | Nagaraj et al. |
| 2007/0201554 A1 | 8/2007 | Sihn |
| 2007/0211953 A1 | 9/2007 | Sasagawa |
| 2007/0223583 A1 | 9/2007 | Nagai et al. |
| 2008/0008246 A1 | 1/2008 | Mukherjee et al. |
| 2008/0043848 A1 | 2/2008 | Kuhn |
| 2008/0084929 A1 | 4/2008 | Li |
| 2008/0123736 A1 | 5/2008 | Sekiguchi et al. |
| 2008/0123947 A1 | 5/2008 | Moriya et al. |
| 2008/0123977 A1 | 5/2008 | Moriya et al. |
| 2008/0253463 A1 | 10/2008 | Lin et al. |
| 2008/0310512 A1* | 12/2008 | Ye ................ H04N 19/197 375/240.16 |
| 2009/0041128 A1 | 2/2009 | Howard |
| 2009/0049641 A1 | 2/2009 | Pullins et al. |
| 2009/0067503 A1 | 3/2009 | Jeong et al. |
| 2009/0122864 A1 | 5/2009 | Palfner et al. |
| 2009/0123066 A1 | 5/2009 | Moriya et al. |
| 2009/0228290 A1 | 9/2009 | Chen et al. |
| 2009/0274382 A1 | 11/2009 | Lin et al. |
| 2010/0020867 A1 | 1/2010 | Wiegand et al. |
| 2010/0086049 A1 | 4/2010 | Ye et al. |
| 2010/0246951 A1 | 9/2010 | Chen et al. |
| 2010/0290520 A1 | 11/2010 | Kamisli et al. |
| 2010/0309286 A1 | 12/2010 | Chen et al. |
| 2011/0032983 A1 | 2/2011 | Sezer |
| 2011/0090959 A1 | 4/2011 | Wiegand et al. |
| 2011/0182352 A1 | 7/2011 | Pace |
| 2011/0206135 A1 | 8/2011 | Drugeon et al. |
| 2011/0243249 A1 | 10/2011 | Lee et al. |
| 2011/0268183 A1 | 11/2011 | Sole et al. |
| 2011/0274162 A1 | 11/2011 | Zhou et al. |
| 2011/0286516 A1 | 11/2011 | Lim et al. |
| 2011/0293009 A1 | 12/2011 | Steinberg et al. |
| 2011/0293012 A1 | 12/2011 | Au et al. |
| 2012/0008683 A1 | 1/2012 | Karczewicz et al. |
| 2012/0057360 A1 | 3/2012 | Swan |
| 2012/0057630 A1 | 3/2012 | Saxena et al. |
| 2012/0128066 A1 | 5/2012 | Shibahara et al. |
| 2012/0162455 A1 | 6/2012 | Kim et al. |
| 2012/0170649 A1 | 7/2012 | Chen et al. |
| 2012/0177116 A1 | 7/2012 | Panusopone et al. |
| 2012/0201298 A1 | 8/2012 | Panusopone et al. |
| 2012/0230411 A1 | 9/2012 | Liu et al. |
| 2012/0230418 A1 | 9/2012 | Sole Rojals et al. |
| 2012/0308128 A1 | 12/2012 | Oosake |
| 2013/0003824 A1 | 1/2013 | Guo et al. |
| 2013/0003828 A1 | 1/2013 | Cohen et al. |
| 2013/0003859 A1 | 1/2013 | Karczewicz et al. |
| 2013/0022107 A1 | 1/2013 | Van der Auwera et al. |
| 2013/0034152 A1 | 2/2013 | Song et al. |
| 2013/0034169 A1 | 2/2013 | Sadafale et al. |
| 2013/0070845 A1 | 3/2013 | Lim et al. |
| 2013/0089138 A1 | 4/2013 | Guo et al. |
| 2013/0089145 A1 | 4/2013 | Guo et al. |
| 2013/0114730 A1 | 5/2013 | Joshi et al. |
| 2013/0128974 A1 | 5/2013 | Chien et al. |
| 2013/0136175 A1 | 5/2013 | Wang et al. |
| 2013/0156328 A1 | 6/2013 | Wang et al. |
| 2013/0176211 A1 | 7/2013 | Inada et al. |
| 2013/0243083 A1 | 9/2013 | Sezer |
| 2013/0272422 A1 | 10/2013 | Lee et al. |
| 2013/0315303 A1 | 11/2013 | Min et al. |
| 2013/0336410 A1 | 12/2013 | Nguyen et al. |
| 2014/0010295 A1 | 1/2014 | Lu et al. |
| 2014/0086314 A1 | 3/2014 | Hebel et al. |
| 2014/0092956 A1 | 4/2014 | Panusopone et al. |

FOREIGN PATENT DOCUMENTS

| | | |
|---|---|---|
| WO | 2010039015 A2 | 4/2010 |
| WO | 2010039288 A1 | 4/2010 |
| WO | 2011049399 A2 | 4/2011 |
| WO | 2012005099 A1 | 1/2012 |
| WO | 2012166959 A1 | 12/2012 |
| WO | 2014031544 A1 | 2/2014 |
| WO | 2014078703 A1 | 5/2014 |

(56) References Cited

OTHER PUBLICATIONS

Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Bross, B, W.-J Han, J.-R. Ohm, G. J. Sullivan, T. Wiegand: "High efficiency video coding (HEVC) text specification draft 7", Document of Joint Collaborative Team on Video Coding, JCTVC-I1003-d4, Apr. 27-May 7, 2012.
Bross, B, H. Kirchoffer, H. Schwarz, T. Wiegand,"Fast intra encoding for fixed maximum depth of transform quadtree," JCTVC-C311_r1, Guangzhou, CN, Oct. 2010.
Chen J et al. "Description of scalable video coding technology proposal by Qualcomm (configuration)", 11. JCT-VC Meeting; 102. MPEG Meeting; Oct. 10, 2012 Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 2, 2012, all pages.
Chen J. et al., "TE:Simulation results for various max. number of transform quadtree depth," MPEG Meeting, Guangzhou, Chima; No. M18236; Oct. 28, 2010.
Chen P. et al., "Video coding using extended block sizes," VCEG Meeting, San Diego, US; No. VCEG-AJ23, Oct. 15, 2008.
Chen, Y, J. Han, T. Nanjundaswamy, and K. Rose, "A joint spatio-temporal filtering approach to efficient prediction in video compression," Picture Coding Symposium, 2013.
Guo L et al.: "Transform Selection for Inter-Layer Texture Prediction in Scalable Video Coding", 11. JCT-VC Meeting; 102; MPEG Meeting; Oct. 10, 2012-Oct. 19, 2012; Shanghai; (Joint Collaborative Team on Video Coding of ISO/IEC JTC1/WG11 and ITU-T SG. 6); URL:http;//wftp3.itu.int/av-arch/jctvc-site/,, No. JCTVC-K0321, Oct. 7, 2012, all pages.
Han et al., "Jointly Optimized Spatial Prediction and Block Transform for Video and Image Coding," IEEE Transactions on Image Processing, vol. 21, No. 4 (Apr. 2012).
Han et al., "Toward Jointly Optimal Spatial Prediction and Adaptive Transform in Video/Image Coding," ICASSP 2010 (Dallas, TX, Mar. 14-19, 2010).
International Preliminary Report and Written Opinion of the International Searching Authority for International Application No. PCT/US2013062216 dated Mar. 31, 2015.
Krit Panusopone et al., "Flexible Picture Partitioning", JCT-VC (Joint Collaborative Team on Video Coding) JCTVC-C260, Meeting, Oct. 7-Oct. 15, 2010.
Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.
Lee B. et al., "Hierarchical variable block transform," JCT-VC Meeting, Geneva, Switzerland; No. JCTVC-B050; Jul. 24, 2010.
Lee T et al.: "TE12.1: Experimental results of transform unit quadtree/2-level test", 3 JCT-VC Meeting; 94. MPEG Meeting; Oct. 7, 2010-Oct. 15, 2010; Guangzhou; (Joint Collaborative Team on Video Coding of ISO/IEC JTC1/SC29/WG11 and ITU-T SG.16); URL:http://wftp3.itu.int/av-arch/jctvc-site/,, No. JCTVC-C200, Oct. 2, 2010, all pages.

McCann et al., "Samsung's Response to the call for proposals on video compression technology" JCTVC of ITU-T SG16 WP3 and ISO/IEC JTC1/SC29/WG11; 1st meeting; Dresden, DE, Apr. 15-23, 2010; JCTVC124; 42 pages.
McCann K. et al.; "Video coding technology proposal by samsung (and BBC)," JCT-VC Meeting; Dresden, Germany, Apr. 15, 2010.
Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Saxena a et al.: "On secondary transforms for Intra BVL residue", 13. JCT-VC Meeting; 104. MPEG Meeting; Apr. 18, 2013-Apr. 26, 2013; IncHEON; (Joint Collaborative Team on Video Coding of ISO/IEC JTC1/SC29/WG11 and ITU-T SG.16); URL:http://wftp3.itu.int/av-arch/jctvc-site/, No. JCTVC-M0033, Apr. 9, 2013, all pages.
Saxena a et al.: "On secondary transforms for intra/inter prediction residual", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL:http://wftp3.itu.int/av-arch/jcivc-site/,, No. JCTVC-10232, Apr. 17, 2012, all pages.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sikora, T. et al., Shape-adaptive DCT for generic coding of video, Circuits and Systems for Video Technology, IEEE Transactions on vol. 5, Issue 1, p. 59-62, Feb. 1, 1995.
VP6 Bitstream & Decoder Specification. Version 1.03. On2 Technologies, Inc. Dated Oct. 29, 2007.
Wiegand et al., "Overview of the H 264/AVC Video Coding Standard," IEEE Transactions on Circuits and Systems for Video Technology, vol. 13, No. 7, pp. 568, 569, Jul. 1, 2003.
Wiegand et al. "BoG report: residual quadtree structure" JCTVC-C319_r1, Guangzhou, CN Oct. 2010.
Wiegand, T; B. Bross, J. Ohm, G. Sullivan, "WD1: Working Draft 1 of High-Efficiency Video Coding," JCTVC-C403, Guangzhou, CN, Oct. 7-15, 2010.
Wiegand, Thomas, et al.; Long-Term Memory Motion-Compensated Prediction, date unknown.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Xin, J., K. N. Ngan, and G. Zhu, "Combined inter-intra prediction for high definition video coding," Picture Coding Symposium, 2007.

* cited by examiner

|  | DCT/ DCT | DCT/ ADST | ADST/ DCT | ADST/ ADST |
|---|---|---|---|---|
| 16x16 | PM1 | PM2 | PM3 | PM4 |
| 8x8 | PM5 | PM6 | PM7 | PM8 |
| 4x4 | PM9 | PM10 | PM11 | PM12 |

FIG. 11

HYBRID TRANSFORM IN VIDEO CODECS

CROSS-REFERENCE TO RELATED APPLICATION(S)

This application is a continuation of U.S. application Ser. No. 13/763,921, filed on Feb. 11, 2013.

TECHNICAL FIELD

This disclosure relates to encoding and decoding visual data, such as video stream data, for transmission or storage.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques.

SUMMARY

Disclosed herein are aspects of systems, methods and apparatuses for coding a video stream having a plurality of frames.

An aspect of the disclosure is a method for decoding an encoded video stream. The method includes receiving an encoded video stream, identifying an encoded block of an encoded frame from the encoded video stream, identifying an intra prediction mode for decoding the encoded block from the encoded video stream, wherein the intra prediction mode is one of a plurality of intra prediction modes, and identifying a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column. The method includes identifying a probability model from a plurality of probability models for decoding the encoded block based on the transform mode, wherein each probability model from the plurality of probability models is associated with at least one transform mode from the plurality of transform modes, identifying a scan mode for decoding the encoded block based on the transform mode, generating a decoded block by decoding the encoded block using the scan mode, the probability model, the transform mode, and the intra prediction mode, and outputting or storing the decoded block.

Another aspect of the disclosure is an apparatus for decoding an encoded video stream. The apparatus includes a non-transitory computer readable memory, and a processor configured to execute instructions stored in the non-transitory computer readable memory to receive an encoded video stream, identify an encoded block of an encoded frame from the encoded video stream, identify an intra prediction mode for decoding the encoded block from the encoded video stream, wherein the intra prediction mode is one of a plurality of intra prediction modes, and identify a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column. The processor configured to execute instructions stored in the non-transitory computer readable memory to identify a probability model from a plurality of probability models for decoding the encoded block based on the transform mode, wherein each probability model from the plurality of probability models is associated with at least one transform mode from the plurality of transform modes, identify a scan mode for decoding the encoded block based on the transform mode, generate a decoded block by decoding the encoded block using the scan mode, the probability model, the transform mode, and the intra prediction mode, and output or store the decoded block.

Another aspect of the disclosure is non-transitory computer-readable storage medium, comprising executable instructions that, when executed by a processor, facilitate performance of operations, comprising receiving an encoded video stream, identifying an encoded block of an encoded frame from the encoded video stream, identifying an intra prediction mode for decoding the encoded block from the encoded video stream, wherein the intra prediction mode is one of a plurality of intra prediction modes, and identifying a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column. The operations comprising identifying a probability model from a plurality of probability models for decoding the encoded block based on the transform mode, wherein each probability model from the plurality of probability models is associated with at least one transform mode from the plurality of transform modes, identifying a scan mode for decoding the encoded block based on the transform mode, generating a decoded block by decoding the encoded block using the scan mode, the probability model, the transform mode, and the intra prediction mode, and outputting or storing the decoded block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 11 is a diagram of an example of probability models in accordance with aspects of the teachings herein.

DETAILED DESCRIPTION

Real-time video streaming, multi-point video conferencing or video broadcasting are examples of applications that employ video stream encoding including compression. One compression technique uses prediction to reduce the amount of data to be encoded. A block may be predicted by generating a prediction block using either inter prediction or intra prediction. Inter prediction generates the prediction block by performing a motion search to find pixel data matching the block from, e.g., another frame. Intra prediction generates the prediction block using pixel data from nearby blocks. The pixel data used to generate the prediction block is encoded. To encode the current block, only the differences (called a residual) between the current block and the prediction block need be encoded. This is less data that encoding the current block in its entirety.

In a transform-based codec, decorrelating transforms may be used that code the residual. Certain transforms, however, are less effective for coding residuals resulting from intra prediction. According to the teachings herein, the types and sizes of the transform applied to the prediction residual block are selected according to the prediction mode. The entropy coding of the quantized transform coefficients, including size, scanning order and probability model, are then specifically designed for each sub-portion of the coefficients. This can improve coding efficiency over transforms based on only a single block size.

First discussed below are environments in which aspects of this disclosure can be implemented, and then details of certain implementations are explained.

Figure 1:
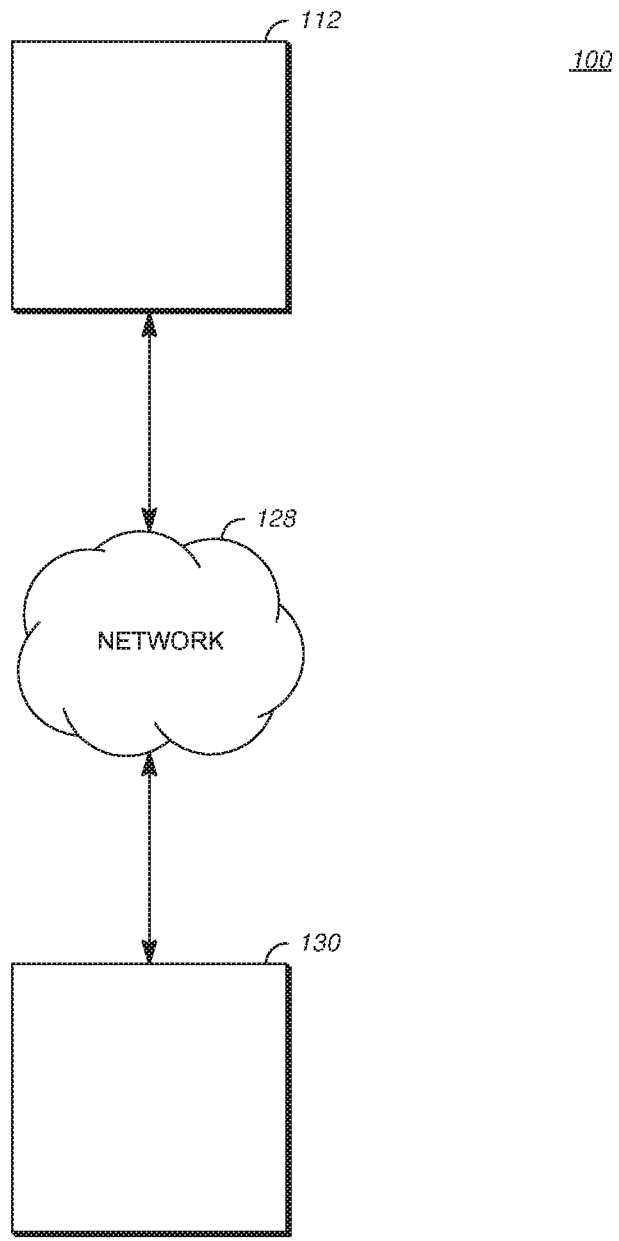
FIG. 1 is a schematic diagram of a video encoding and decoding system.

FIG. 1 is a schematic diagram of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
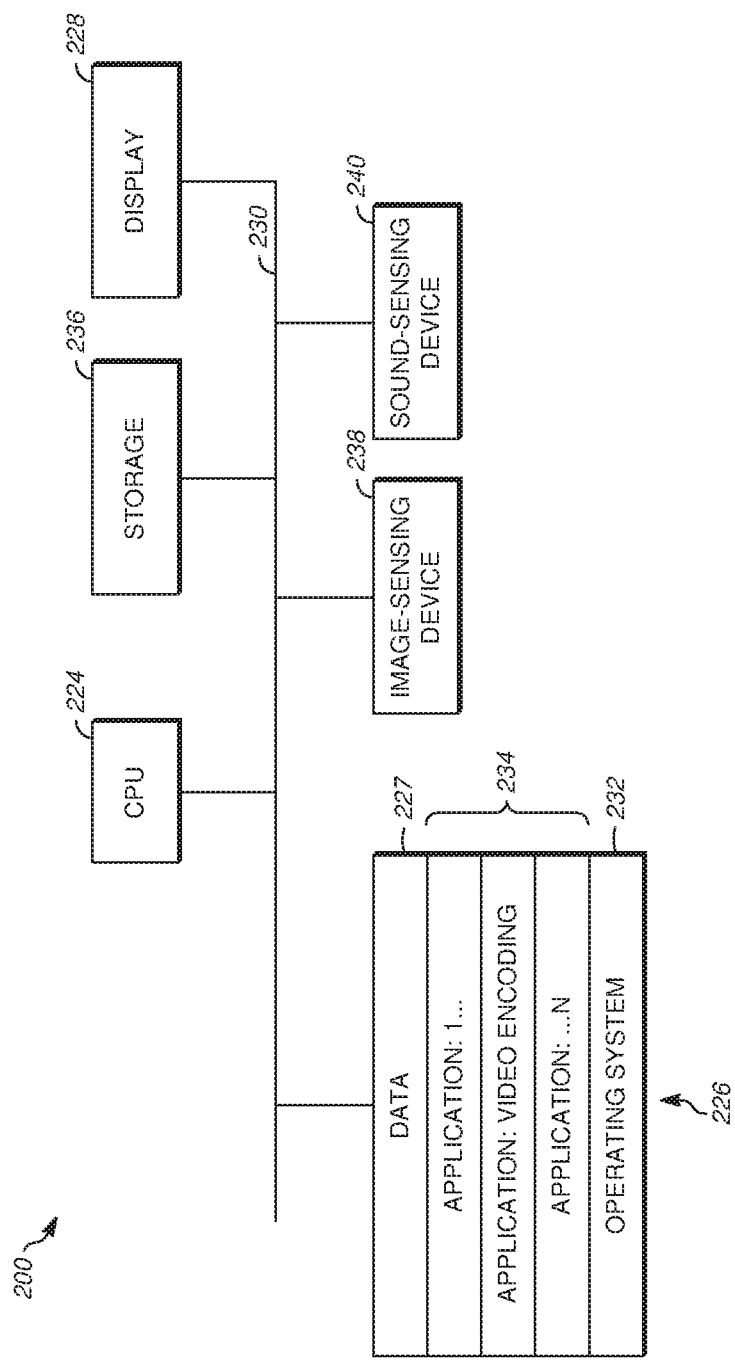
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
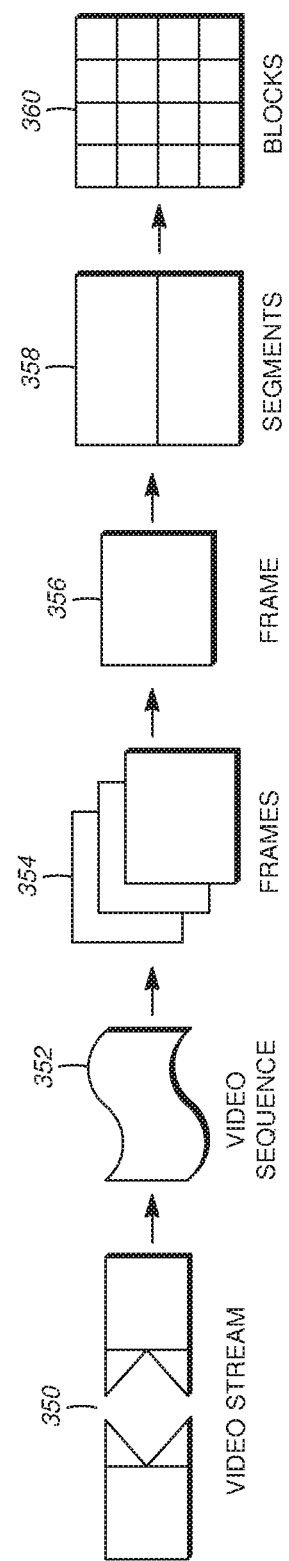
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, a single frame 356 can be divided into a series of segments or planes 358. Segments or planes 358 can be subsets of frames that permit parallel processing, for example. Segments or planes 358 can be subsets of frames 354 that separate the video data in a frame 356 into, for example, separate colors. In one implementation, frame 356 of color video data can include a luminance plane 358 and two chrominance planes 358. Planes 358 can be sampled at different resolutions.

Segments or planes 358 can include blocks 360 that contain data corresponding to, for example, 16×16 pixels in frame 356. Blocks 360 can also be of any other suitable size such as 4×4, 8×8 16×8, 8×16, 16×16, or larger. nless otherwise noted, the terms block and macroblock are used interchangeably herein.

Figure 4:
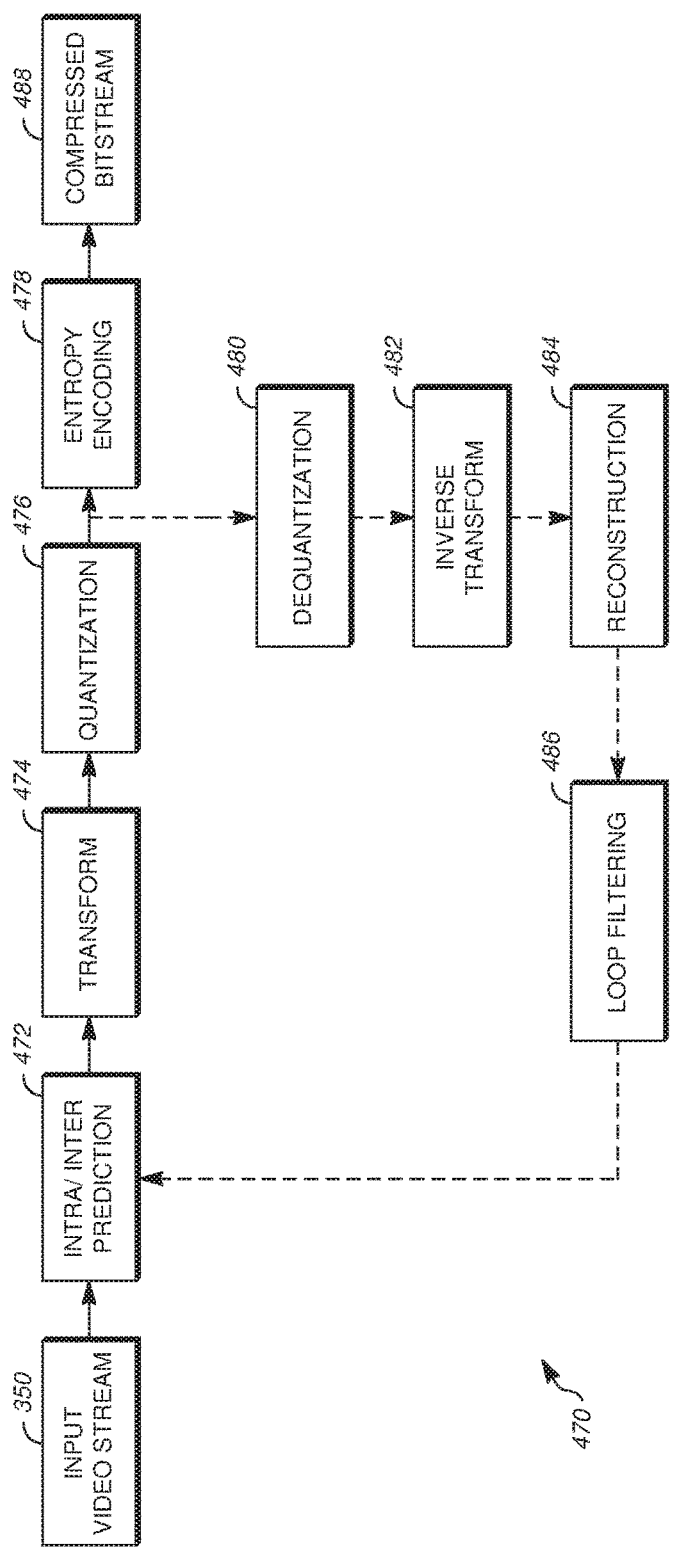
FIG. 4 is a block diagram of a video compression system.

FIG. 4 is a block diagram of an encoder 470 in accordance with an implementation. Encoder 470 can be implemented in transmitting station 112, as described above, such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 including planes 358 within video stream 350 can be processed in units of blocks 360. At the intra/inter prediction stage 472, each block 360 can be encoded using intra-frame prediction (also called intra prediction) or inter-frame prediction (also called inter prediction). In any case, a prediction block can be formed. In the case of intra prediction, a prediction block can be formed from samples in the current frame that have been previously encoded and reconstructed. In the case of inter prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loéve Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. In an implementation described herein, an Asymmetric Discrete Sine Transform (ADST) is used.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
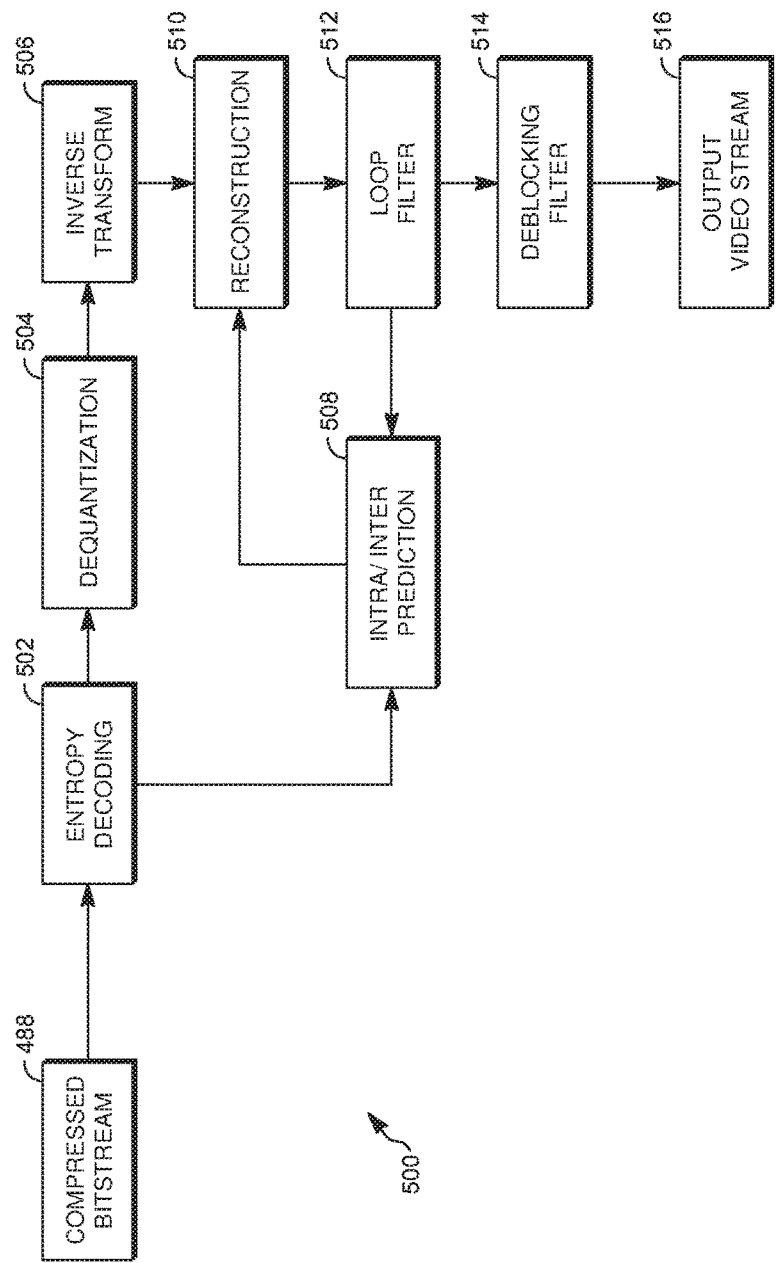
FIG. 5 is a block diagram of a video decompression.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

Figure 6:
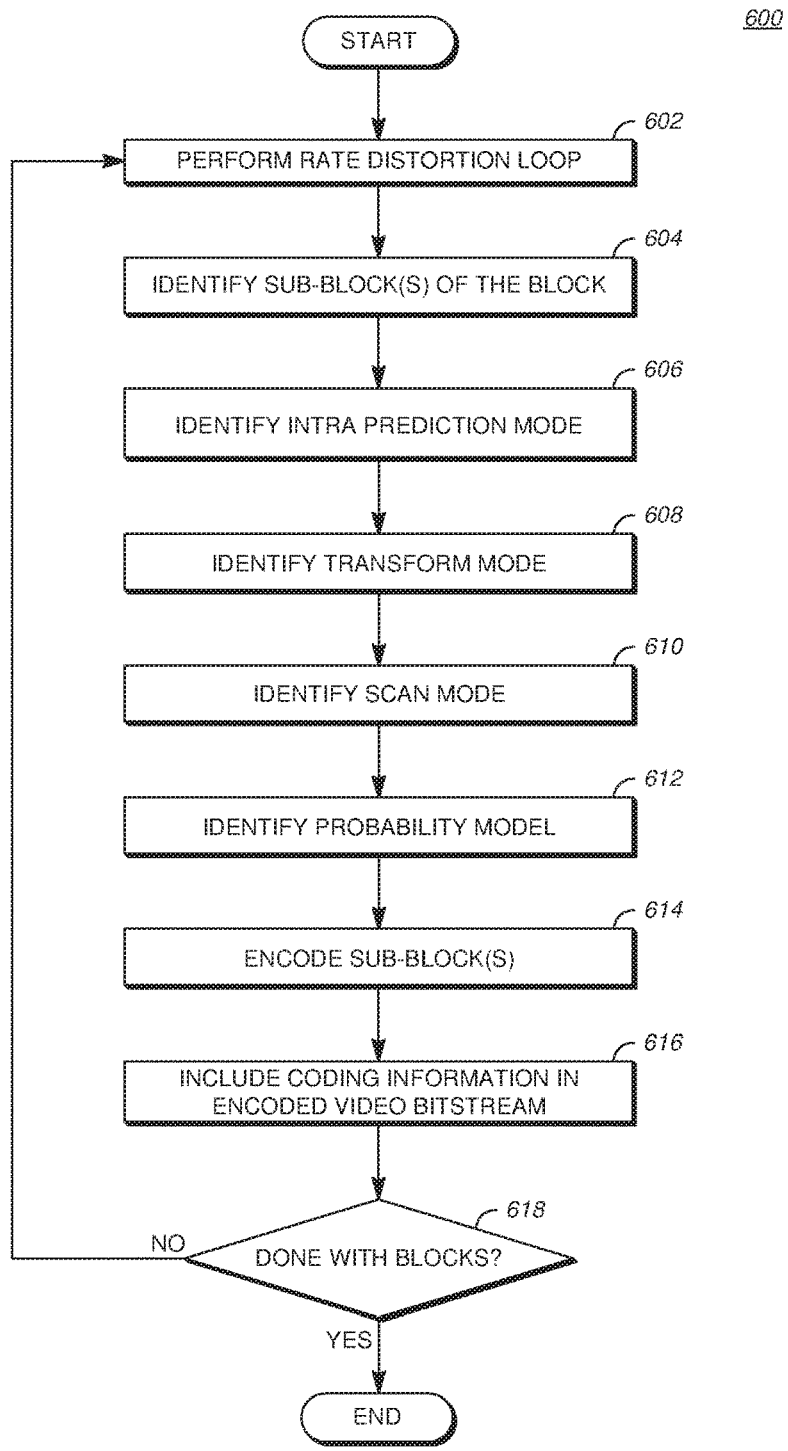
FIG. 6 is a flowchart diagram of a process for encoding of a video stream in accordance with aspects of the teachings herein.

FIG. 6 is a flowchart diagram of a process 600 for encoding of a video stream in accordance with aspects of the teachings herein. Process 600 encodes variably-sized sub-blocks and can be implemented in a system such as encoder 470 to encode a video stream using intra prediction and variably sized sub-blocks. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, process 600 begins a rate distortion loop by identifying a block of a plurality of blocks included in a frame of the plurality of frames of a video stream. A rate distortion loop processes the blocks of a frame by calculating rate distortion values for each block in a scan order. For example, the blocks of a frame can be identified in raster scan order, where the blocks are identified and processed starting with a block in the upper left corner of the frame and proceeding along rows from left to right from the top row to the bottom row, identifying each block in turn for processing.

A rate distortion loop calculates a value that can minimize the bits required to encode the block for a given distortion value, where distortion can be measured by calculating a difference function between the original block data and encoded/decoded block data. The rate distortion loop can calculate a rate distortion value for various prediction modes and identify an optimal prediction mode by comparing the rate distortion values for the various prediction modes. For example, two prediction modes having a similar distortion value can be distinguished by identifying the one with the lower bit rate. In another example two prediction modes having similar bit rates can be distinguished by identifying the one with the lowest distortion value.

Figure 8:
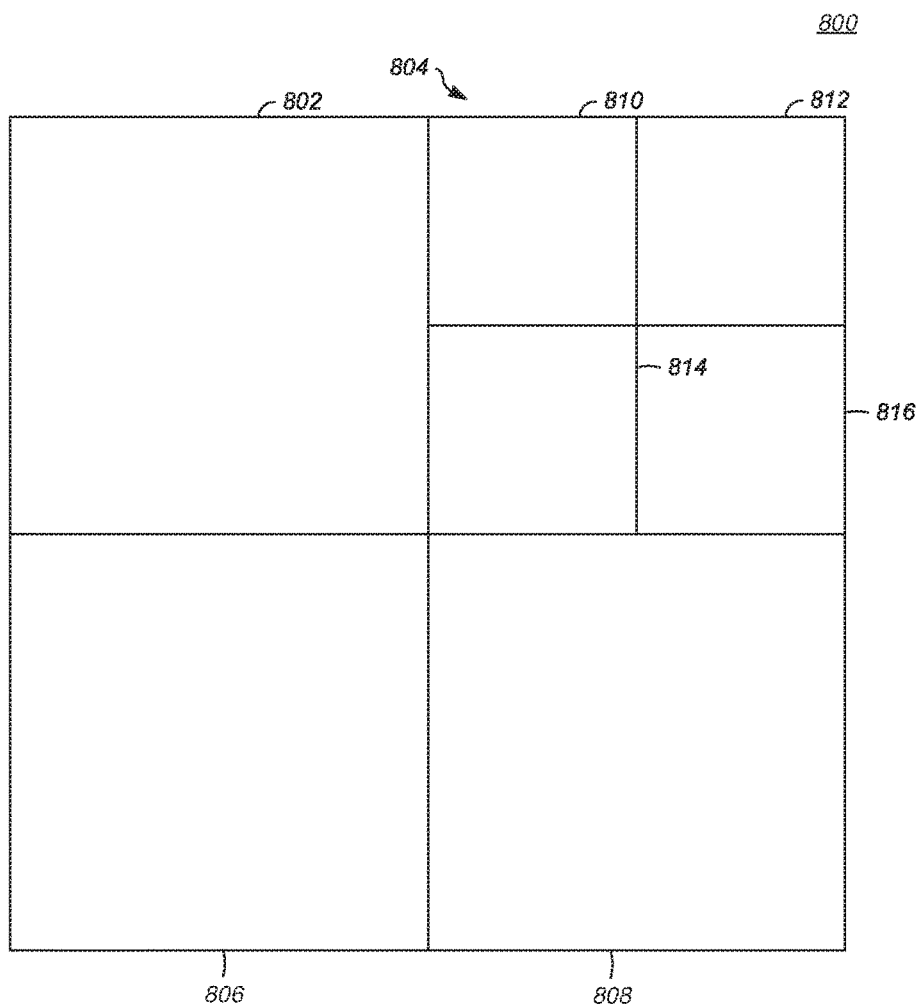
FIG. 8 is a diagram showing a block and sub-blocks in accordance with aspects of the teachings herein.

At step 604, the block can be divided into sub-blocks. For example, a 16×16 block can be divided into two 8×8 blocks, and at least one of the 8×8 blocks can be divided into two 4×4 blocks. An example of this is shown in FIG. 8. FIG. 8 is a diagram showing a block and sub-blocks in accordance with aspects of the teachings herein. A 16×16 block 800 is divided into four 8×8 blocks 802, 804, 806 and 808. Block 804 is further divided into four 4×4 blocks 810, 812, 814 and 816. Dividing the block into sub-blocks can be based on results of the rate distortion loop, where rate distortion values can be calculated for various arrangements of sub-blocks and compared. If dividing the block or sub-block in to smaller sub-blocks can improve the rate distortion values for a particular prediction mode, the block can be so divided.

At step 606, the rate distortion loop identities optimal intra prediction modes for the sub-blocks of the block. The rate distortion loop may calculate rate distortion values for combinations of sub-blocks and intra prediction modes to identify a combination of sub-blocks and intra prediction modes that provide the lowest bit rate for a given distortion level. The rate distortion loop can do this by exhaustively calculating rate distortion values for each combination of sub-blocks and intra prediction modes, or by using probability-based techniques to first calculate rate distortion values for combinations of sub-blocks and intra prediction modes that have previously yielded good results in other blocks of the frame or other frames of the video stream. Combinations of sub-blocks and intra prediction modes that have not yielded good results can be eliminated from being tested by the rate distortion loop, for example, thereby speeding up the process of identifying an optimal set of sub-blocks and intra prediction modes. In addition, intermediate results can be tested against a threshold and, if calculation of a particular combination of sub-block and intra prediction mode exceeds a threshold, the calculation for that combination of sub-block size and intra prediction mode can be stopped and the next combination tested.

Figure 9:
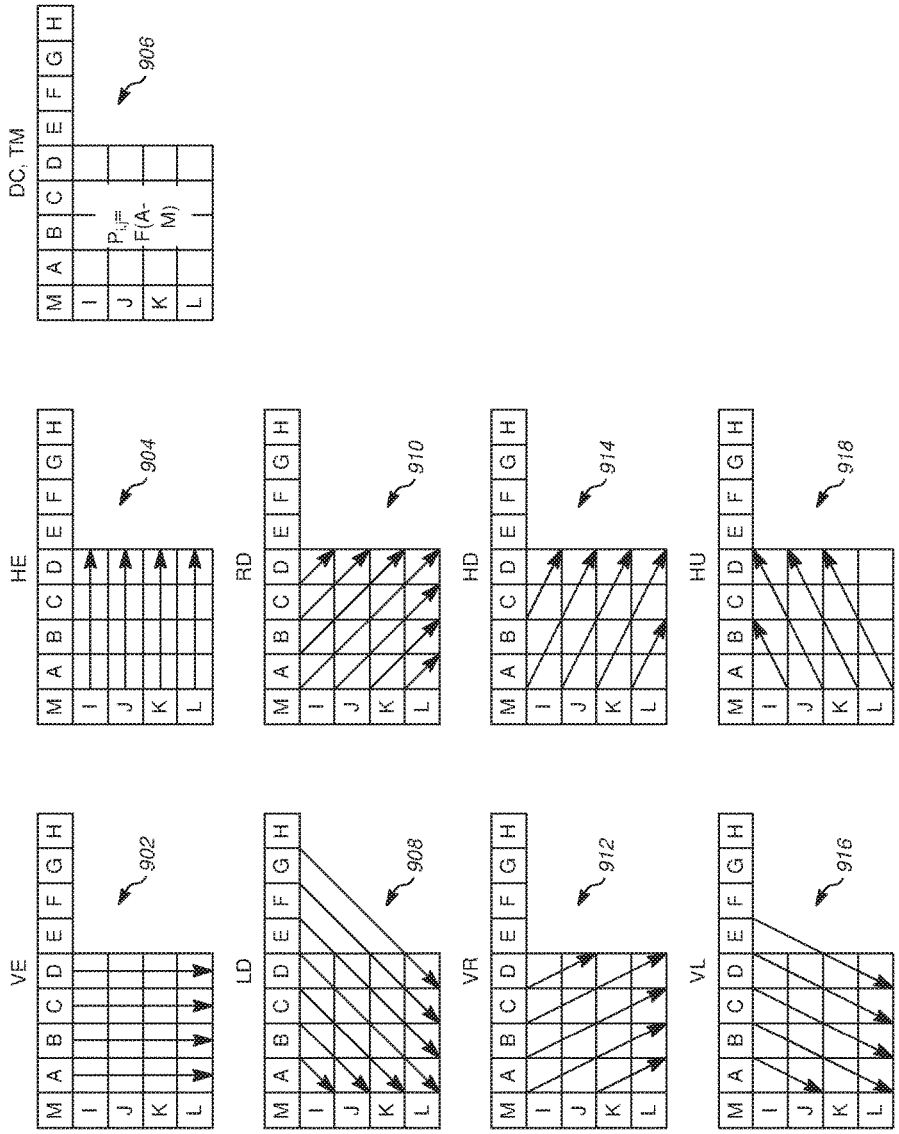
FIG. 9 is a diagram of intra prediction modes in accordance with aspects of the teachings herein.

Certain intra prediction modes can be described in relation to FIG. 9. FIG. 9 is a diagram of intra prediction modes in accordance with aspects of the teachings herein. Specifically, FIG. 9 shows ten intra prediction modes illustrated on nine diagrams representing 4×4 blocks of pixels with peripheral pixels A through M. Intra prediction includes forming a prediction block by filling a block with pixel values based on some or all of peripheral pixels A through M. Diagram 902 illustrates vertical mode VE, which propagates peripheral pixels A through D down the columns of the prediction block such that each pixel in a column is set equal to the adjacent peripheral pixel A through D in the direction of the arrows. Diagram 904 illustrates horizontal mode HE, which similarly propagates the peripheral pixels I through L along horizontal rows of the block in the direction of the arrows. Diagram 906 includes two different modes, DC and True-Motion (TM) mode. In each of these modes, the pixels of the block are set equal to a function of the peripheral pixels, for example an average of pixels A through D and I through J for DC mode or the peripheral pixel above the pixel of the block (one of A through D) plus the peripheral pixel in the same row as the pixel (one or I through L) minus peripheral pixel M for TM mode.

Diagram 908 illustrates diagonal down/left mode LD, which forms a prediction block as a weighted average of two or three peripheral pixels (from pixels A through H) and propagates the weighted averages into the 4×4 pixel prediction block in the direction of the arrows. Diagram 910 illustrates diagonal down/right mode RD, which includes forming weighted averages of two or three pixels from peripheral pixels A through D and I through M and propagates the weighted averages in the direction of the arrows. Diagram 912 illustrates vertical/right mode VR, which includes forming weighted averages of two or three pixels from peripheral pixels I through M and propagates them into the 4×4 prediction block along the arrows. Diagram 914 illustrates horizontal/down mode HD, which includes forming weighted averages of two or three pixels from the peripheral pixels A through D and I through M and propagates the pixels to form the prediction block. Diagram 916 illustrates mode vertical/left VL, which includes forming weighted averages of pixels A through H and propagating the weighted averages into the 4×4 prediction block according to the arrows. Diagram 918 illustrates horizontal/up mode HU, which includes forming weighted averages of pixels I through M and propagates the weighted averages into the 4×4 prediction block according to the arrows.

Returning to FIG. 6, at step 608 transform modes are identified based on the identified sub-blocks and intra prediction modes. The transform mode can be first identified by matching the size of the transform to the size of the sub-block. For example, if a block is divided into a variety of sub-blocks including 8×8 and 4×4 sub-blocks, each sub-block can be transformed using transforms equal in size to the sub-block. The transform mode can be further identified by matching the type of transform to the intra prediction mode. The identified transform can be applied to the residual pixel data of the sub-blocks following intra prediction. For example, the two-dimensional (2D) array of pixels of a block or sub-block can be transformed by first applying one-dimensional (1D) transforms to the columns (vertical) of the sub-blocks followed by applying 1D transforms to the transformed rows (horizontal) or vice-versa.

The 1D transforms applied to columns can be different than the 1D transforms applied to rows. For example, both DCT and ADST can be applied to blocks in this manner. Table 1 includes the transform types for the residual block based on the intra prediction mode.

TABLE 1

| Transform mode | Intra Prediction mode | First transform type/direction | Second transform type/direction |
| --- | --- | --- | --- |
| 1 | TM | ADST/vertical | ADST/horizontal |
| 2 | RD | ADST/vertical | ADST/horizontal |
| 3 | VE | ADST/vertical | DCT/horizontal |
| 4 | VR | ADST/vertical | DCT/horizontal |
| 5 | HE | DCT/vertical | ADST/horizontal |
| 6 | HD | DCT/vertical | ADST/horizontal |
| 7 | HU | DCT/vertical | ADST/horizontal |
| 8 | DC | DCT/vertical | DCT/horizontal |
| 9 | LD | DCT/vertical | DCT/horizontal |
| 10 | VL | DCT/vertical | DCT/horizontal |

Following identification of transform modes (sizes and types) in step 608, the residual pixel data is transformed using the identified 1D transforms, and then the transformed residual pixel values are quantized to reduce the number of bits required to represent the pixel data. Quantization generates, for example, a 2D block of quantization indices. The quantization values are selected according to any known technique.

At step 610, scan modes for the sub-blocks of the block are identified based on the transform modes. The scanning order is designed to re-organize the 2D block of quantization indices into the format of a scalar sequence to permit entropy coding the transformed, quantized residual pixel values.

Figure 10:
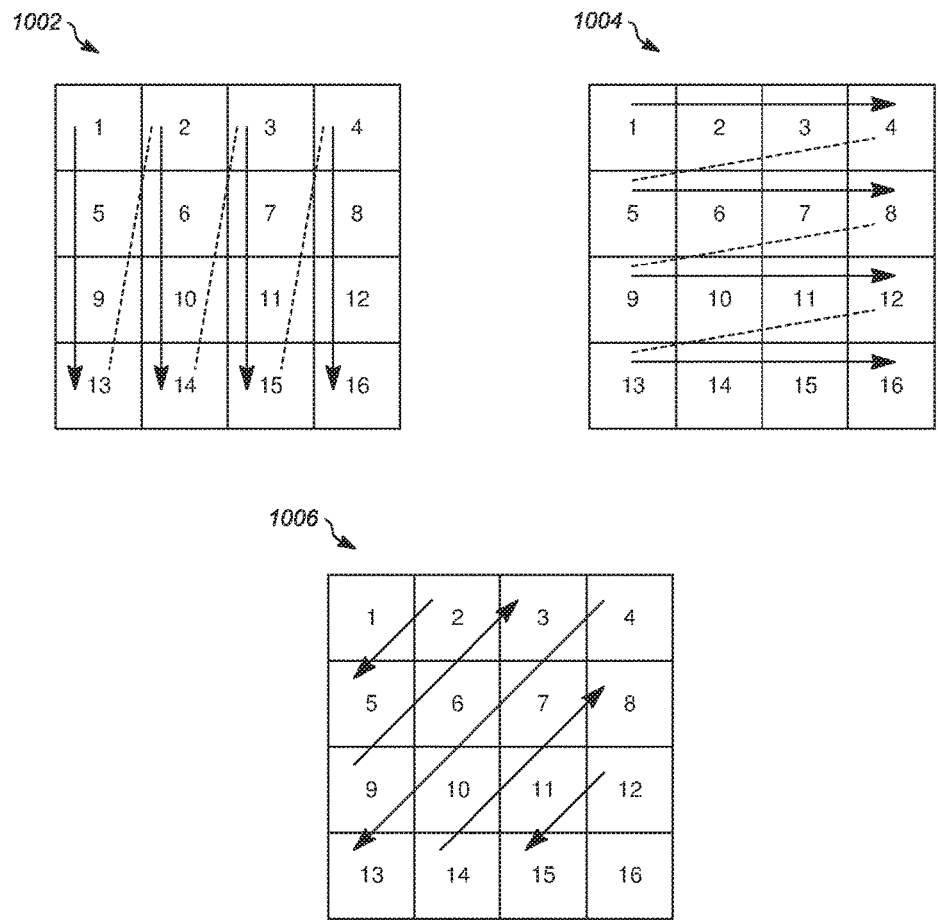
FIG. 10 is a diagram of scan modes in accordance with aspects of the teachings herein.

When the sub-block size is 4×4 (N×N) and the transform mode is 3 or 4 from Table 1, the quantized, residual block may be scanned according to the arrows shown in block 1002 of FIG. 10. That is, the columns of the block are scanned vertically from left to right to produce a 1D array of pixels corresponding to pixels 1 through 16 in block 1002. This can be referred to as column-wise scanning. For sub-block size 4×4 and transform mode 6 or 7 from Table 1, the quantized, residual block may be scanned according to the arrows as shown in block 1004 of FIG. 10. That is, the rows of the block are scanned horizontally from top to bottom to produce a 1D array of pixels corresponding to pixels 1 through 16 in block 1004. This can be referred to as row-wise scanning.

Zig-zag scanning as shown in block 1006 of FIG. 10 may be used to form a 1D array of pixels 1 through 16 for sub-block size 4×4 and any of transform modes 1, 2, 5, 8, 9 or 10. Sub-block sizes 8×8 and 16×16 may be scanned with zig-zag scanning as shown for example in block 1006 of FIG. 10 regardless of transform mode.

Returning to FIG. 6, once the scan mode is identified and the sub-blocks are scanned to form respective 1D arrays of pixels for each sub-block of the block, at step 612 probability models that determine entropy codes for encoding the block are identified for each sub-block depending upon the transform type and sub-block size.

FIG. 11 is a diagram of an example of probability models in accordance with aspects of the teachings herein. The example is shown in a two-dimensional table 1100, the columns 1102 of which are formed by the transform modes, and the rows 1104 of which are formed by the sub-block sizes. The teachings herein contemplate maintaining separate, unique probability models for each transform type at each size. More specifically, FIG. 11 illustrates columns 1102 representing the four exemplary transform modes, DCT/DCT, DCT/DST, DST/DCT and DST/DST described above and rows 1104 representing three block sizes. The four transform modes and three block sizes combine to identify twelve probability models PM1-PM12 in this example. Probability models describe the relative probability with which quantized values occur following quantization of a transformed block. The more frequently occurring quantized values can be ordered by the entropy encoder to be encoded with fewer bits using the correlation of quantization values to frequency in the probability models and the most-recently encoded value per techniques described in, for example, RFC 6386, VP8 Data Format and Decoding Guide (copyright © 2011 IETF Trust and Bankoski et al.), available at http://tools.ietf.org/html/rfc6386. This can losslessly reduce the number of bits required to represent an encoded block.

More or fewer modes and other sizes are possible. In addition, block sizes can be combined if it is determined that the probability models associated with the block sizes are similar enough that efficient entropy encoding can occur using a single set of probability models for more than one block size. That is, although it is contemplated that the probability model for each transform mode and size is unique, this may not be done. The same probability model may be used for more than one block size and/or more than one transform mode to simplify encoding and decoding if the differences between the ideal probability model(s) and the common probability model used are such that there is not a significant increase in the bit count after entropy coding of the residual block using the common probability model instead of the ideal probability model(s) for the residual block. In some implementations, initial values of the probability distributions in table 1100 can be determined in advance by using empirical data, and can include normalized counts of occurrences of the prediction modes.

In implementation of the teachings herein, process 600 may keep track of the rate of occurrence of quantized values as the blocks of a frame are being encoded. These rates of occurrence are categorized by the size of the block and the transform mode used. Periodically, such as after completing encoding of a frame and before beginning the next frame, the encoder may update the probability models with the data gathered from the just completed frame. Other update periods are possible by, for example, establishing checkpoints that update the probability models while a frame is being processed.

Probability models can attempt to track the most often used bit patterns in the 1D arrays of predicted, re-aligned, transformed, quantized and scanned pixels and substitute shorter bit patterns for the most frequently used patterns, thereby reducing the number of bits included in the encoded video bitstream. The probability models may be included along with the pixel data in the encoded video bitstream to assist in decoding the blocks at a decoder.

At step 614, the block is encoded using the identified sub-blocks, if any, prediction mode(s), transform mode(s) and scan mode(s) and is then entropy coded using the identified probability models. The block may be divided into sub-blocks for prediction, and each sub-block can be predicted to form a residual sub-block, which is then transformed, quantized, scanned and entropy coded. The encoded sub-blocks are included in an encoded video bitstream. Then, at step 616, bits identifying the arrangement of sub-blocks, prediction modes, transform modes and scan modes used to encode the block can be included in the encoded video bitstream to assist a decoder in decoding the encoded video bitstream. The decoder may also receive the probability models. Note that, in some cases, identifying the sub-block sizes and intra-prediction modes can identify the transform modes, scan modes and probability model to be used in decoding the block, and therefore including bits indicating sub-block sizes and intra prediction modes may be included in the encoded video bitstream and information regarding scan modes, transform modes and probability model can be derived without requiring additional bits in a block header for the block within the encoded video bitstream.

At step 618, process 600 can test to see if any block of the frame remains to be processed, at which time process 600 can loop back to step 602 to perform rate distortion calculations on a next block from the frame in the scan order of the blocks. If no more blocks remain to be processed at step 618, process 600 can exit.

Figure 7:
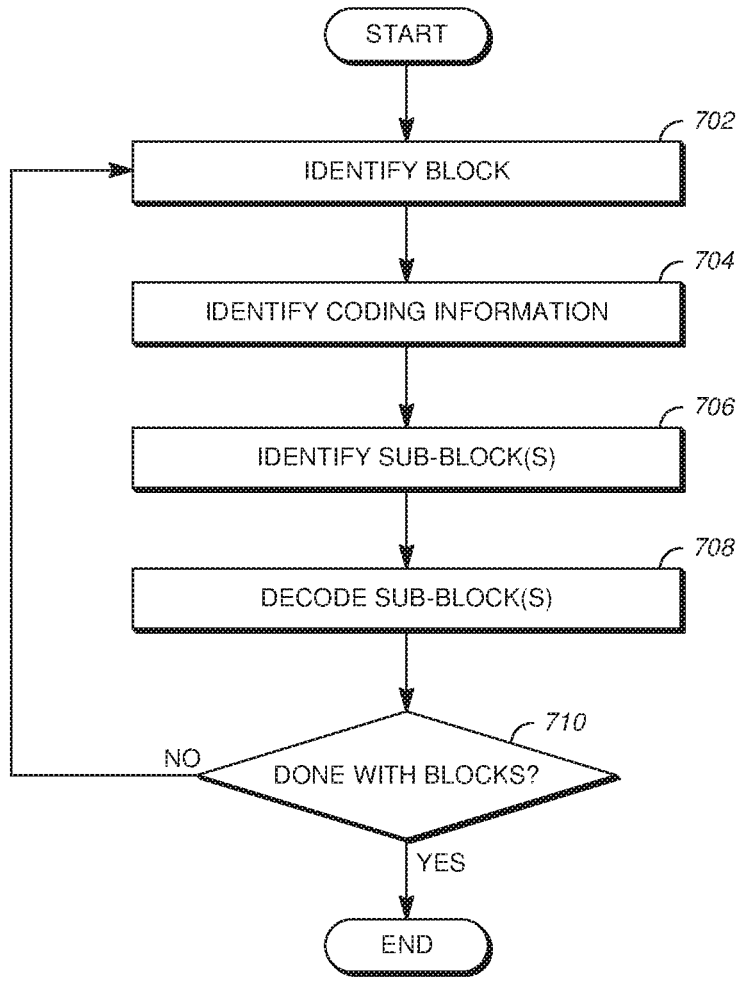
FIG. 7 is a flowchart diagram of a process for decoding of a video stream in accordance with aspects of the teachings herein.

FIG. 7 is a flowchart diagram of a process 700 for decoding of a video stream in accordance with aspects of the teachings herein. Process 700 can be implemented in a system such as system 500 to decode a video stream using intra prediction and variable sized transforms. Process 700 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 700. Process 700 can also be implemented using hardware in whole or in part. As explained above, some computing devices may have multiple memories and multiple processors, and the steps of process 700 may in such cases be distributed using different processors and memories.

For simplicity of explanation, process 700 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 702, a block from an encoded video bitstream is identified. The encoded video bitstream includes header information that identifies frames and blocks of the video bitstream and information included by the encoder at process 600 to identify modes used to encode the block. At step 704, process 700 identifies header information regarding sub-block sizes and intra prediction modes that were used by an encoder to encode the block of video data, for example using process 600. If the block was encoded using inter prediction, that block is processed according to any known technique, and process 700 returns to step 702 to obtain a new block for processing.

At step 706, process 700 can use header data to identify sub-blocks into which the block may be divided for further processing. As described above in relation to FIG. 6, identifying the sub-block sizes and prediction modes used to encode the block may be enough information to identify the transform mode, scan mode and probability model to be used to decode the block. In other cases, more information may be included in the header to identify various modes for decoding the block.

At step 708, the sub-blocks of the block can be decoded using the identified intra prediction modes, transform modes, scan modes and entropy codes. The sub-blocks can be decoded by entropy decoding the data bitstream, inverse scanning the data to reconstruct the 2D blocks and de-quantizing the 2D blocks to form transformed residual blocks. The transformed residual blocks are then inverse transformed using the appropriate 1D transform types for the size and intra prediction mode, and the prediction blocks are generated using the identified intra prediction modes. Finally, the prediction blocks are added to the residual blocks. At step 710, process 700 checks the input encoded video bitstream to determine if any more blocks of a frame remain to be decoded. If any more blocks remain, process 700 loops back to step 702 to identify a next block for processing. If no more blocks of the frame remain, process 700 can exit.

According to the teachings herein, coding efficiency of residuals generated using intra prediction is improved by conforming the transform size to the prediction block size and then selecting a transform type and the scanning order of the subsequently quantized block based on the intra prediction mode. Separate probability models are maintained for each transform type and size such that entropy coding codes (and decodes) the quantization indices using a probability model that correspond to the type and size of the transform in use. The probability models may be adapted during processing of the blocks according to accumulated statistics.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for decoding an encoded video stream, the method comprising:
    receiving an encoded video stream;
    identifying an encoded block of an encoded frame from the encoded video stream;
    identifying an intra prediction mode for decoding the encoded block from the encoded video stream, wherein the intra prediction mode is one of a plurality of intra prediction modes;
    identifying a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column;
    identifying a probability model from a plurality of probability models for decoding the encoded block based on the transform mode, wherein each probability model from the plurality of probability models is associated with at least one transform mode from the plurality of transform modes;
    identifying a scan mode for decoding the encoded block based on the transform mode;
    generating a decoded block by decoding the encoded block using the scan mode, the probability model, the transform mode, and the intra prediction mode; and
    outputting or storing the decoded block.

2. The method of claim 1, wherein identifying the transform mode includes:
    identifying a transform size for decoding the encoded block; and
    identifying a transform type for decoding the encoded block.

3. The method of claim 2, wherein each probability model from the plurality of probability models is associated with one transform mode from the plurality of transform modes and one size from a plurality of available sizes for decoding the encoded block.

4. The method of claim 2, wherein each probability model from the plurality of probability models is associated with at least one transform mode from the plurality of transform modes and at least one size from a plurality of available sizes for decoding the encoded block.

5. The method of claim 4, wherein a probability model from the plurality of probability models is associated with at least two transform modes from the plurality of transform modes and at least two sizes from the plurality of available sizes.

6. The method of claim 1, wherein identifying the intra prediction mode includes reading the intra prediction mode from a header for the encoded block.

7. The method of claim 6, wherein reading the intra prediction mode includes decoding the header from the encoded video stream.

8. The method of claim 1, wherein the scan mode is one of a plurality of scan modes, wherein the plurality of scan modes includes a column-wise scan mode, a row-wise scan mode, and a zig-zag scan mode, and wherein each transform mode from the plurality of transform modes is associated with a scan mode from the plurality of scan modes.

9. The method of claim 1, wherein the plurality of intra prediction modes includes at least two of a TrueMotion mode, a DC mode, a diagonal down/left mode, a diagonal down/right mode, a vertical/right mode, a horizontal/down mode, a vertical/left mode, or a horizontal/up mode.

10. An apparatus for decoding an encoded video stream, the apparatus comprising:
    a non-transitory computer readable memory; and
    a processor configured to execute instructions stored in the non-transitory computer readable memory to:
        receive an encoded video stream;
        identify an encoded block of an encoded frame from the encoded video stream;
        identify an intra prediction mode for decoding the encoded block from the encoded video stream, wherein the intra prediction mode is one of a plurality of intra prediction modes;
        identify a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column;

identify a probability model from a plurality of probability models for decoding the encoded block based on the transform mode, wherein each probability model from the plurality of probability models is associated with at least one transform mode from the plurality of transform modes;

identify a scan mode for decoding the encoded block based on the transform mode;

generate a decoded block by decoding the encoded block using the scan mode, the probability model, the transform mode, and the intra prediction mode; and output or store the decoded block.

11. The apparatus of claim 10, wherein the processor is configured to execute instructions stored in the non-transitory computer readable memory to identify the transform mode by:
identifying a transform size for decoding the encoded block; and
identifying a transform type for decoding the encoded block.

12. The apparatus of claim 11, wherein each probability model from the plurality of probability models is associated with one transform mode from the plurality of transform modes and one size from a plurality of available sizes for decoding the encoded block.

13. The apparatus of claim 11, wherein each probability model from the plurality of probability models is associated with at least one transform mode from the plurality of transform modes and at least one size from a plurality of available sizes for decoding the encoded block.

14. The apparatus of claim 13, wherein a probability model from the plurality of probability models is associated with at least two transform modes from the plurality of transform modes and at least two sizes from the plurality of available sizes.

15. The apparatus of claim 10, wherein the processor is configured to execute instructions stored in the non-transitory computer readable memory to identify the intra prediction mode by:
reading the intra prediction mode from a header for the encoded block.

16. The apparatus of claim 15, wherein reading the intra prediction mode includes decoding the header from the encoded video stream.

17. The apparatus of claim 10, wherein the scan mode is one of a plurality of scan modes, wherein the plurality of scan modes includes a column-wise scan mode, a row-wise scan mode, and a zig-zag scan mode, and wherein each transform mode from the plurality of transform modes is associated with a scan mode from the plurality of scan modes.

18. The apparatus of claim 10, wherein the plurality of intra prediction modes includes at least two of a TrueMotion mode, a DC mode, a diagonal down/left mode, a diagonal down/right mode, a vertical/right mode, a horizontal/down mode, a vertical/left mode, or a horizontal/up mode.

19. A non-transitory computer-readable storage medium, comprising executable instructions that, when executed by a processor, facilitate performance of operations, comprising:
receiving an encoded video stream;
identifying an encoded block of an encoded frame from the encoded video stream;
identifying an intra prediction mode for decoding the encoded block from the encoded video stream, wherein the intra prediction mode is one of a plurality of intra prediction modes;
identifying a transform mode from a plurality of transform modes for decoding the encoded block based on the intra prediction mode, wherein each transform mode from the plurality of transform modes is associated with at least one intra prediction mode from the plurality of intra prediction modes, and wherein the plurality of transform modes includes a one dimensional Asymmetrical Discrete Sine Transform applied to each horizontal row followed by a one dimensional Asymmetrical Discrete Sine Transform applied to each vertical column, the one dimensional Asymmetrical Discrete Sine Transform applied to each horizontal row followed by a one dimensional Discrete Cosine Transform applied to each vertical column, the one dimensional Discrete Cosine Transform applied to each horizontal row followed by the one dimensional Asymmetrical Discrete Sine Transform applied to each vertical column, and the one dimensional Discrete Cosine Transform applied to each horizontal row followed by the one dimensional Discrete Cosine Transform applied to each vertical column;
identifying a probability model from a plurality of probability models for decoding the encoded block based on the transform mode, wherein each probability model from the plurality of probability models is associated with at least one transform mode from the plurality of transform modes;
identifying a scan mode for decoding the encoded block based on the transform mode;
generating a decoded block by decoding the encoded block using the scan mode, the probability model, the transform mode, and the intra prediction mode; and
outputting or storing the decoded block.

20. The non-transitory computer-readable storage medium of claim 19, wherein:
each probability model from the plurality of probability models is associated with a transform mode from the plurality of transform modes and a size from a plurality of available sizes for decoding the encoded block;
identifying the transform mode includes:
identifying a transform size for decoding the encoded block; and
identifying a transform type for decoding the encoded block;
identifying the intra prediction mode includes reading the intra prediction mode from a header for the encoded block, wherein reading the intra prediction mode includes decoding the header from the encoded video stream, and wherein the plurality of intra prediction modes includes at least two of a TrueMotion mode, a DC mode, a diagonal down/left mode, a diagonal down/right mode, a vertical/right mode, a horizontal/down mode, a vertical/left mode, or a horizontal/up mode; and
the scan mode is one of a plurality of scan modes, wherein the plurality of scan modes includes a column-wise scan mode, a row-wise scan mode, and a zig-zag scan mode, and wherein each transform mode from the plurality of transform modes is associated with a scan mode from the plurality of scan modes.

* * * * *